(12) United States Patent
Anderson et al.

(10) Patent No.: US 11,492,108 B2
(45) Date of Patent: Nov. 8, 2022

(54) WING AND ROTOR VECTORING SYSTEM FOR AIRCRAFT

(71) Applicant: VerdeGo Aero, Inc., De Leon Springs, FL (US)

(72) Inventors: Richard Pat Anderson, Daytona Beach, FL (US); Eric Richard Bartsch, Wilmette, IL (US)

(73) Assignee: VerdeGo Aero, Inc., De Leon Springs, FL (US)

( * ) Notice: Subject to any disclaimer, the term of this patent is extended or adjusted under 35 U.S.C. 154(b) by 16 days.

(21) Appl. No.: 16/956,816

(22) PCT Filed: Dec. 21, 2018

(86) PCT No.: PCT/US2018/067138
§ 371 (c)(1),
(2) Date: Jun. 22, 2020

(87) PCT Pub. No.: WO2019/126668
PCT Pub. Date: Jun. 27, 2019

(65) Prior Publication Data
US 2021/0371096 A1 Dec. 2, 2021

Related U.S. Application Data

(60) Provisional application No. 62/609,902, filed on Dec. 22, 2017.

(51) Int. Cl.
*B64C 29/00* (2006.01)
*B64C 3/38* (2006.01)
*B64C 13/50* (2006.01)

(52) U.S. Cl.
CPC .......... *B64C 29/0033* (2013.01); *B64C 3/385* (2013.01); *B64C 13/50* (2013.01)

(58) Field of Classification Search
CPC .................................................. B64C 29/0033
See application file for complete search history.

(56) References Cited

U.S. PATENT DOCUMENTS

| 2,147,188 | A | * | 2/1939 | Barrow | ............... B64C 29/0033 |
| | | | | | 244/7 R |
| 3,035,789 | A | | 5/1962 | Young | |

(Continued)

FOREIGN PATENT DOCUMENTS

| GB | 402992 A | 12/1933 |
| WO | 2017200609 A1 | 11/2017 |

OTHER PUBLICATIONS

ISA/US, International Search Report and Written Opinion of the Int'l Searching Authority issued in PCT/US18/67138, dated Mar. 25, 2019, 14 pgs.

(Continued)

*Primary Examiner* — Richard R. Green
*Assistant Examiner* — William L Gmoser
(74) *Attorney, Agent, or Firm* — Greenberg Traurig, LLP

(57) ABSTRACT

An aircraft is configured with a propulsion system having a rotor with both cyclic and collective control, and an axis of rotation about which the propulsion system rotates with respect to the fuselage. A control system is configured to use torque generated through cyclic control of the rotor to reposition the propulsion system around the axis of rotation without the need for an independent actuator mechanism to rotate the propulsion system, thus reducing the weight and mechanical complexity of the aircraft. The control system may also utilize the torque provided by one or more rotors to position one or more wings with respect to the airflow over the aircraft, exerting torque on the aircraft to control the direction of the aircraft.

22 Claims, 9 Drawing Sheets

(56) References Cited

U.S. PATENT DOCUMENTS

| | | | |
|---|---|---|---|
| 3,586,262 A * | 6/1971 | Sherman | B64C 29/0033 244/7 R |
| 5,839,691 A | 11/1998 | Lariviere | |
| 6,789,764 B2 | 9/2004 | Bass et al. | |
| 7,510,143 B1 | 3/2009 | Bartelsen et al. | |
| 7,871,033 B2 | 1/2011 | Kerem et al. | |
| 8,256,704 B2 | 9/2012 | Lundgren | |
| 8,376,264 B1 * | 2/2013 | Hong | B64C 27/605 244/17.23 |
| 2007/0158494 A1 | 7/2007 | Burrage | |
| 2011/0315806 A1 | 12/2011 | Piasecki et al. | |
| 2016/0083075 A1 | 3/2016 | Moxon | |

OTHER PUBLICATIONS

European Patent Office, Extended Search Report issued in Appl. No. 18892182.9, dated Jul. 23, 2021, 8 pgs.

* cited by examiner

WING AND ROTOR VECTORING SYSTEM FOR AIRCRAFT

CROSS-REFERENCE TO RELATED PATENT APPLICATIONS

This application is a 371 National Stage application of International PCT Application No. PCT/US2018/067138, filed Dec. 21, 2018, which claims the benefit of U.S. Provisional Patent Application No. 62/609,902, filed Dec. 22, 2017, the entire contents of each of which are hereby incorporated by reference in their entirety.

BACKGROUND

Vertical takeoff and landing (VTOL) aircraft are often used for takeoff and landing from small areas without runways, while still having the cruise efficiency provided by a wing. A VTOL aircraft directs thrust vertically in the takeoff and landing phases of flight when the aircraft is in hovering or low-speed flight, and directs the thrust horizontally when in cruising flight to propel the aircraft. Thrust vectoring systems are therefore utilized to make both modes of flight possible.

SUMMARY

In an embodiment, an aircraft is configured with two wings, one positioned forward of the aircraft's center of gravity and one positioned aft of the aircraft's center of gravity, with each wing having multiple rotors, for example, four rotors, attached to it. Each rotor has an axis of thrust that passes through the center of rotation of the rotor and is substantially perpendicular to the plane of rotation of the rotor. The wings are mounted to the fuselage of the aircraft on rotating spars with axes of rotation such that the chord line of each wing may be positioned horizontally, vertically, or in any position between horizontal and vertical. A brake mechanism is configured such that the rotating spars may be locked in a fixed position or released to rotate freely, such that both the chord line of the wing and the axis of thrust of the rotors to pivot with respect to the fuselage. Each rotor's level of thrust may be varied through collective control of the power provided to the rotor and the pitch of the rotor blades. Each rotor may also create torque around multiple axes through the application of cyclic control that varies the angle of attack of the rotor blades depending on their angular position as they rotate around the axis of thrust. When it is desirable to rotate the wings and rotors about the wing's axis of rotation, the brake is released such that the wing spar may rotate with respect to the fuselage. Cyclic control is applied to the rotors to deliver torque around the wing's axis of rotation, causing the wing and the rotors to pivot around the axis of rotation. When the wing reaches a desired angular position with respect to the fuselage, the brake is reapplied, locking the wing in place.

In another embodiment, the aircraft has a single wing with a pair of rotors attached to the wing, with one rotor on each side of the fuselage.

In yet another embodiment, the wings are attached to the fuselage in a fixed position, and the rotors pivot around an axis of rotation with respect to the fuselage to vector the thrust provided by the rotors.

In yet another embodiment, a torque sensor is installed on the wing spar rotation mechanism to sense the torque applied to the wing spar. The torque sensor is incorporated in the control system for the brake mechanism on the rotating wing spar to ensure that the brake is not released if torque on the wing spar is above a specified threshold.

In yet another embodiment, the brake mechanism on the rotating wing spar is configured with a bi-directional ratchet mechanism such that different rotation modes may be selected using the aircraft control system. For example, four modes of rotation that may be used with a brake mechanism that has a bi-directional ratchet mechanism may include free rotation, no rotation permitted, clockwise rotation permitted, and/or counterclockwise rotation permitted.

In various embodiments, the number of rotors at each of the front and back of the aircraft may be more than or less than four.

In various embodiments, the aircraft may include one or more wings.

In various embodiments, the torque sensor and bi-directional ratchet mechanism may be applied to a rotation mechanism that permits the rotor's axis of thrust to rotate with respect to the fuselage on an aircraft with one or more wings in a fixed position.

In various embodiments, the left and right wings may be attached to the fuselage on independent rotating wing spars, permitting the vectoring of the wing and thrust on the left and right sides of the fuselage to vary with respect to each other.

In various embodiments, the differential torque applied by the left and right rotors may be used to position the left and right wings at different angular positions with respect to the fuselage, providing roll control to the aircraft.

In yet another embodiment, the aircraft has a pivoting wing attached to a rotor located ahead of the aircraft's center of gravity and a pivoting wing attached to a rotor located aft of the aircraft's center of gravity, wherein the aircraft control system uses the torque of a front rotor to position a front wing, and the torque of an aft rotor to position an aft wing, such that the pitch axis of the aircraft may be controlled.

In various embodiments, the differential thrust of the rotors on the left and right sides of the fuselage may be used to control the yaw of the aircraft when the rotors are positioned to provide forward thrust.

In various embodiments, the axis of thrust of each rotor may rotate independently with respect to the fuselage.

DETAILED DESCRIPTION

Figure 1:
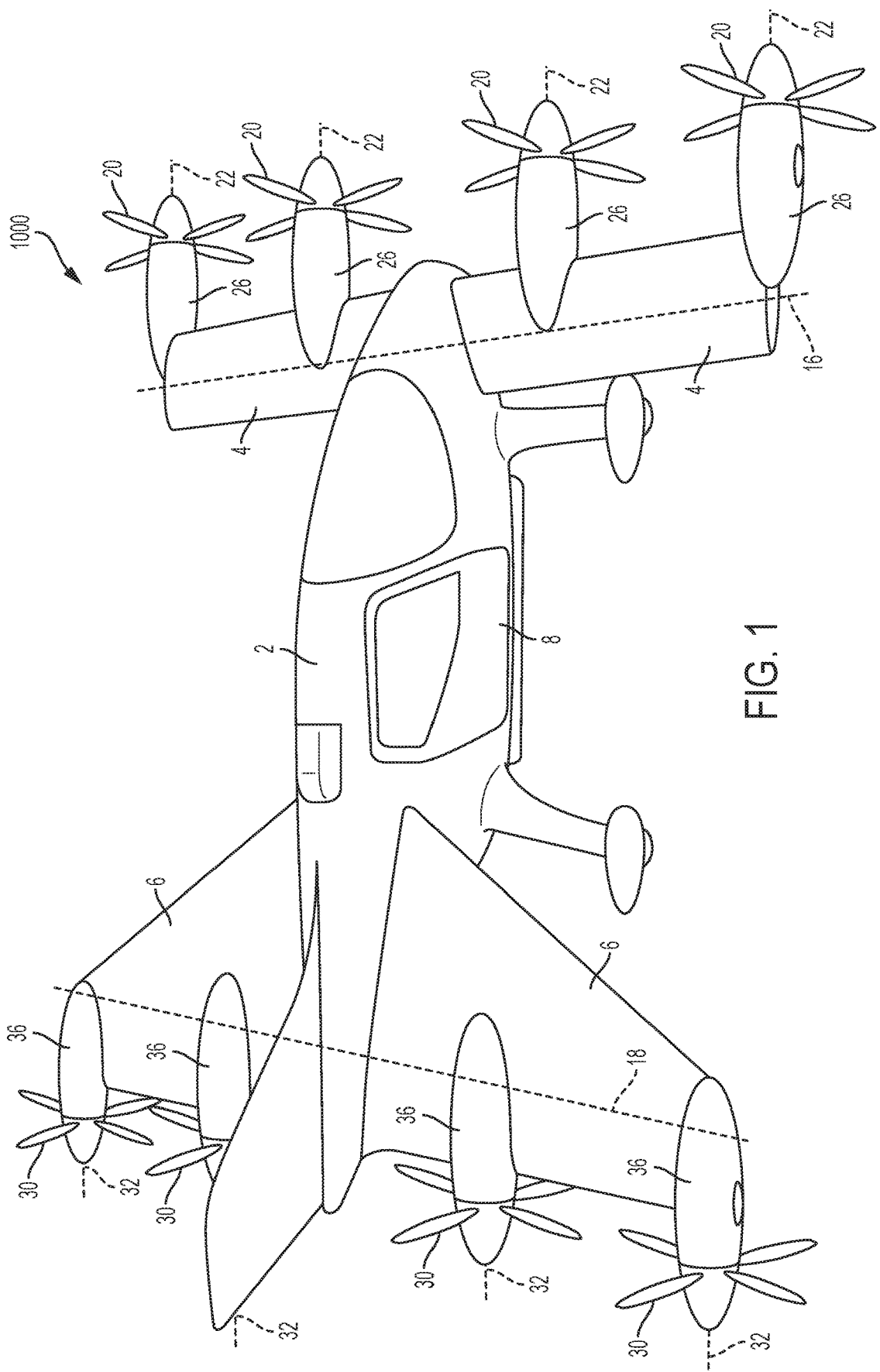
FIG. 1 is an isometric view of an aircraft with the rotors and wing aligned horizontally with respect to the fuselage in accordance with an illustrative embodiment.

Described herein are various embodiments for an aircraft with rotors that are configured to generate torque to realign the angle of a wing with respect to the fuselage by utilizing cyclic control of the rotor to exert torque around the axis of rotation of the wing. In other words, a wing and rotor vectoring system for an aircraft as described herein utilizes the torque generated by rotors to adjust the position of the rotor and wing with respect to the aircraft fuselage. Various configurations detailed herein utilize the torque generated by a rotor to reposition the rotor and the wing to which it is attached with respect to the fuselage of the aircraft, thereby redirecting the thrust generated by the rotor and changing the angle of the wing with respect to the fuselage. Such embodiments advantageously reduce aircraft weight and complexity by eliminating the need for heavy tilt wing actuators. The various embodiments described herein may be applied to vertical takeoff and landing (VTOL) aircraft or other types of aircraft where realigning a direction of thrust and/or an angle of a wing or rotor is desirable.

Vertical takeoff and landing (VTOL) aircraft are desirable to make possible takeoff and landing from small areas without runways. Additionally, VTOL aircraft may have wings that provide cruise efficiency by utilizing the wing to generate aerodynamic lift, thereby reducing or eliminating the need to utilize rotors or propellers to generate vertically-oriented thrust during a horizontal flight mode. Transitioning from a vertical flight configuration to a horizontal flight configuration may involve altering the alignment of the axis of thrust with respect to the fuselage of the airplane in order to either propel the airplane forward in horizontal flight or upward in vertical flight. It is often desirable for an aircraft to change the relative direction of thrust with respect to the axis of the fuselage. This advantageously provides for added maneuverability, increased efficiency, and vertical takeoff and landing capabilities.

Aircraft with tilting wings or engine nacelles may utilize heavy actuator mechanisms to cause the wings or engine nacelles to pivot around an axis of rotation. These actuator mechanisms deliver a significant amount of torque and therefore are both heavy and large, reducing the efficiency of the aircraft. These actuator mechanisms also add to the mechanical complexity of the aircraft and may prevent the aircraft from being safely flown if they are not operational. Some VTOL aircraft may solely utilize propellers and not rotors for propulsion, which does not provide the advantages of the various embodiments described herein that utilize at least some rotors. Some embodiments described herein may achieve the advantages described herein by using a combination of propeller and rotors. A propeller is limited to delivering thrust along its axis of propulsion, while a rotor may deliver thrust along both its axis of propulsion and torque around multiple other axes. Thus, a rotor may generate thrust that is not aligned with the rotational axis of the rotor through the use of cyclic control.

Advantageously, the wing and rotor tilt mechanisms described herein utilize the torque provided through cyclic control of one or more rotors to tilt a wing, thereby utilizing a propulsion system that is already a part of the aircraft (e.g., the rotors) to perform the wing and rotor tilting, thus removing the need for a separate tilt actuator. The rotors of various embodiments described herein may be cyclically controlled. In other words, through cyclic control, the pitch angle, or feathering angle, of the individual rotor blades may be adjusted or changed cyclically depending on their rotational location as they cycle around the hub of the rotor during each rotation. Further advantages of the various embodiments described herein include using multiple redundant rotors attached to the same wing to tilt the wing, as well as using multiple rotors to independently tilt different wings, portions of wings, or propulsion units by utilizing the cyclic control authority present in a rotor system.

Further advantages of the embodiments described herein include using rotor torque to adjust the relative position of multiple wings on an aircraft, such that roll and pitch may be controlled without conventional elevator and aileron controls. This is advantageous because it simplifies the aircraft by removing the elevator or aileron control surfaces and their corresponding actuators, control cables, and pushrods that add weight and lead to mechanical complexity. Aircraft with dedicated actuator mechanisms therefore have heavy additional components. These components may also be limited to slow rates of relative movement between the wing and/or axis of thrust and the fuselage.

Figure 2:
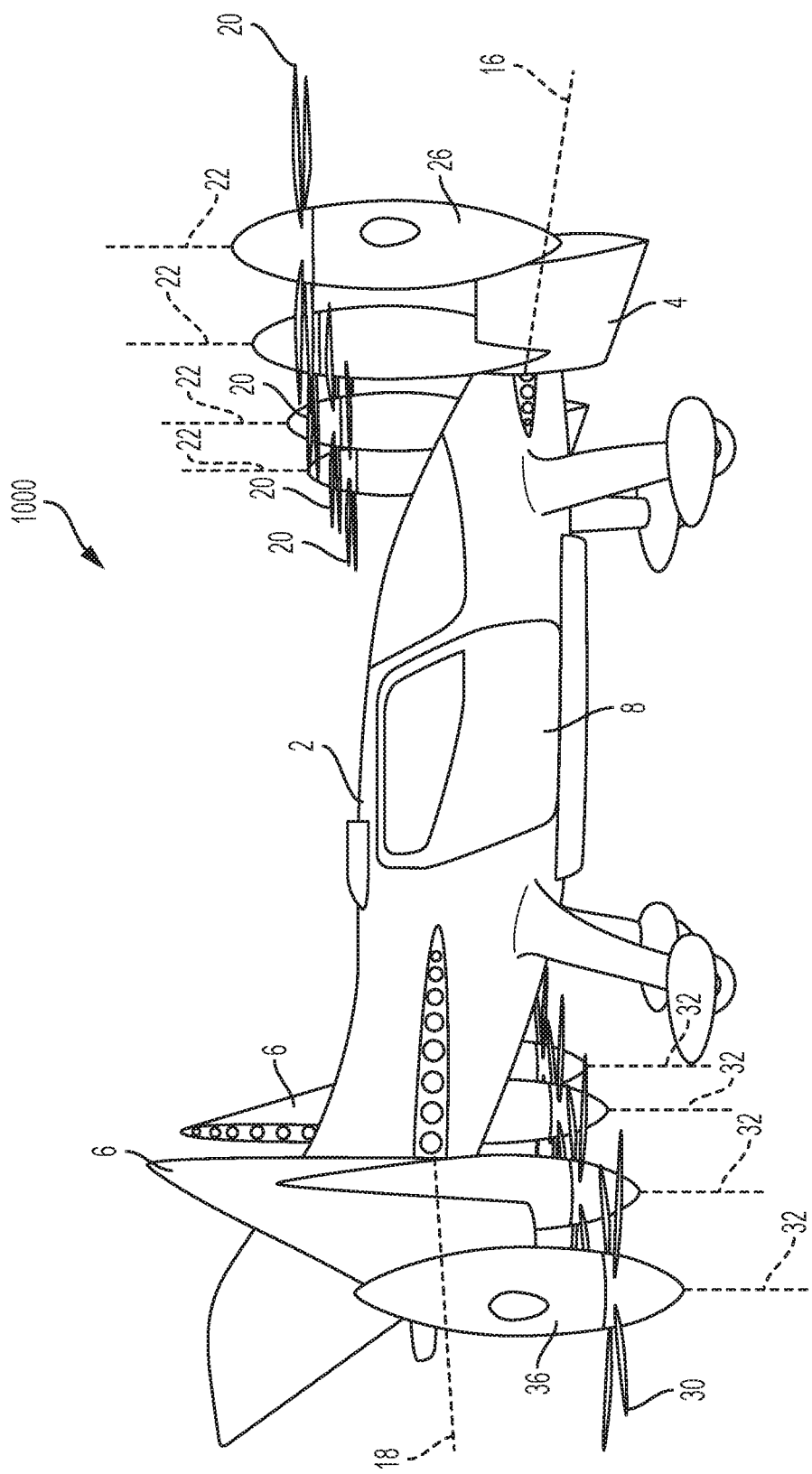
FIG. 2 is a side view of an aircraft with the rotors and wing in a vertical alignment with respect to the fuselage in accordance with an illustrative embodiment.

FIGS. 1-2 illustrate an aircraft 1000 in accordance with an illustrative embodiment. A fuselage 2 contains a passenger compartment 8 where the occupants of the aircraft may be seated. A front wing 4 is attached to the fuselage 2 such that it may pivot around a front vectoring axis 16. A rear wing 6 is attached to the fuselage 2 such that it may pivot around a rear vectoring axis 18. Front motor nacelles 26 are attached rigidly to the front wing 4. Front rotors 20 are attached to the front motor nacelles 26 such that they spin around front thrust axes 22. Rear motor nacelles 36 are attached rigidly to the rear wing 6. Rear rotors 30 are attached to the rear motor nacelles 36 such that they spin around rear thrust axes 32. The front rotors 20 are configured with collective control to vary thrust along the front thrust axes 22, and with cyclic control to vary torque around multiple axes including the front vectoring axis 16. The rear rotors 30 are configured with collective control to vary thrust along the rear thrust axes 32 and with cyclic control to vary torque around multiple axes including the rear vectoring axis 18.

The torque created through cyclic control of the front rotors 20 may be used to pivot the front wing 4 around the front vectoring axis 16 to adjust the position of the front wing 4 and to adjust the relative direction of the front thrust axes 22 with respect to the fuselage 2. The torque created through cyclic control of the rear rotors 30 may be used to the pivot rear wing 6 around the rear vectoring axis 18 to adjust the position of the rear wing 6 and to adjust the direction of the rear thrust axes 32 with respect to the fuselage 2. A control system utilizes data from attitude sensors and accelerometers to adjust the relative thrust and torque delivered by the front rotors 20 and the rear rotors 30 to control the attitude of the fuselage 2, while the front wing 4 rotates around the front vectoring axis 16 and the rear wing 6 rotates around the rear vectoring axis 18.

When the aircraft 1000 is in substantially vertical flight as seen in FIG. 2, the pitch of the aircraft 1000 may be controlled by varying the relative thrust provided by the front rotors 20 and the rear rotors 30 along the front thrust axes 22 and the rear thrust axes 32. Roll of the aircraft 1000 may be controlled by varying the relative thrust of the front rotors 20 and the rear rotors 30 on the left side of the fuselage 2 with respect to the thrust of the front rotors 20 and the rear rotors 30 on the right side of the fuselage 2. The thrust of all the front rotors 20 and the rear rotors 30 may be individually controlled by an aircraft control system.

When the aircraft 1000 is in substantially horizontal flight as seen in FIG. 1, the pitch of the aircraft 1000 may be controlled by varying the angular position of the front wing 4 and the rear wing 6 with respect to the fuselage 2 to cause the wings to act as elevators or flaps.

When the aircraft 1000 has the front wing 4 and the rear wing 6 oriented at an angular position other than that shown in FIGS. 1 and 2, the control of the aircraft is achieved by a combination of adjusting the relative thrust of each of the front rotors 20 and the rear rotors 30 while simultaneously adjusting the angular positions of the front wing 4 and the rear wing 6 with respect to the fuselage 2. The aircraft control system for the aircraft 1000 may independently adjust the torques and thrust of each rotor to adjust pitch, yaw, and roll of aircraft 1000.

Figure 3:
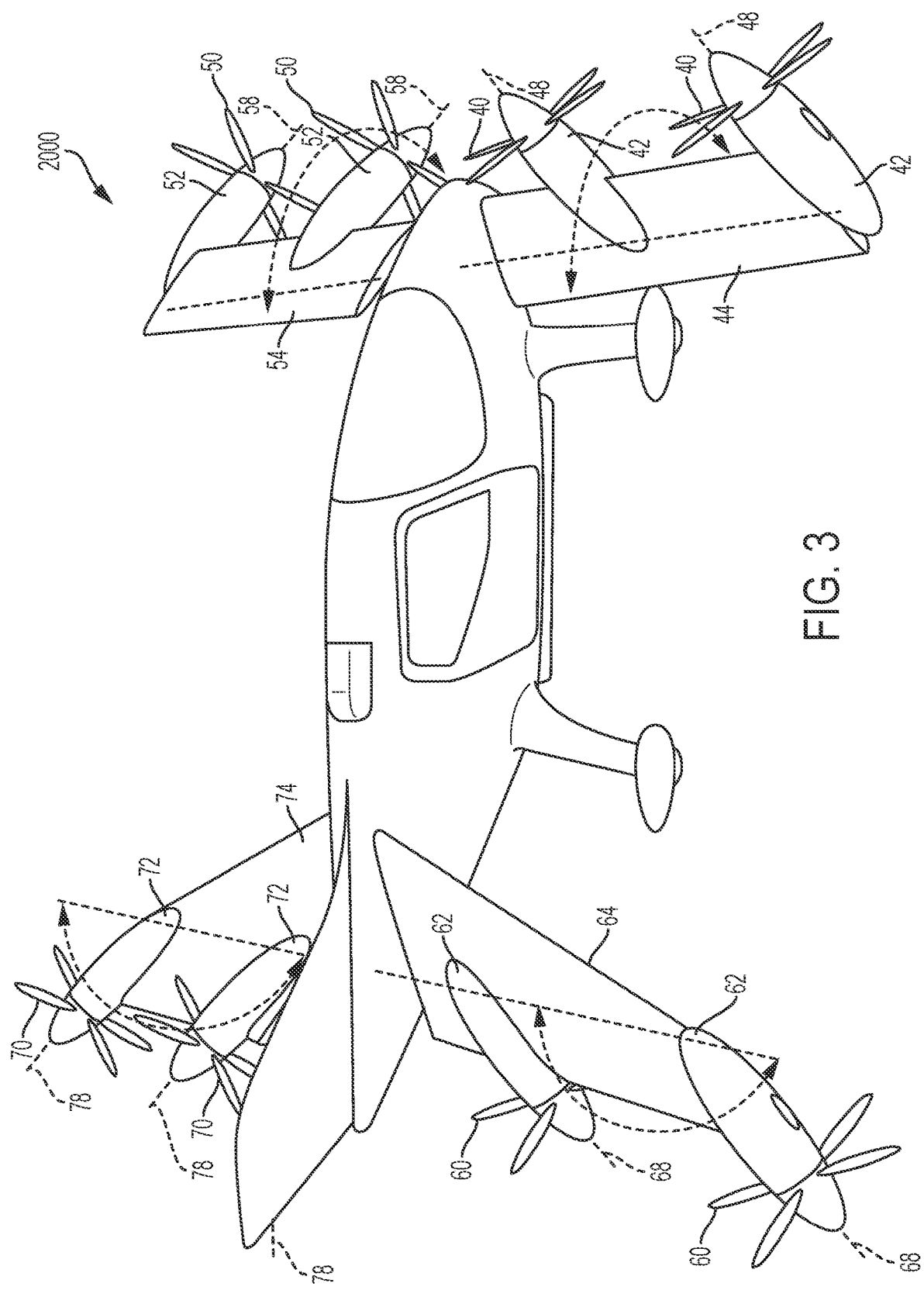
FIG. 3 is an isometric view of an aircraft configured for independent rotation of each wing around its axis with respect to the fuselage in accordance with an illustrative embodiment.

FIG. 3 illustrates a vertical takeoff and landing aircraft 2000 with a front right wing 44, a front left wing 54, a rear right wing 64, and a rear left wing 74. Front right motor nacelles 42 are attached to the front right wing 44, and each of the front right motor nacelles 42 has a corresponding front right rotor 40 for delivering thrust along front right thrust axes 48. Front left motor nacelles 52 are attached to the front left wing 54, and each of the front left motor nacelles 52 has a corresponding front left rotor 50 for delivering thrust along front left thrust axes 58. Rear right motor nacelles 62 are attached to the rear right wing 64, and each of the rear right motor nacelles 62 has a corresponding rear right rotor 60 for delivering thrust along rear right thrust axes 68. Rear left motor nacelles 72 are attached to the rear left wing 74, and each of the rear left motor nacelles 72 has a corresponding rear left rotor 70 for delivering thrust along rear left thrust axes 78.

The aircraft control system for the aircraft 2000 may independently adjust the torque and thrust of each rotor to adjust pitch, yaw, and roll of the aircraft 2000. The aircraft control system may independently position the front right wing 44, the front left wing 54, the rear right wing 64, and the rear left wing 74 to act as ailerons, flaps, or elevators when sufficient forward airflow is present to cause them to control the attitude of the aircraft 2000.

Figure 4:
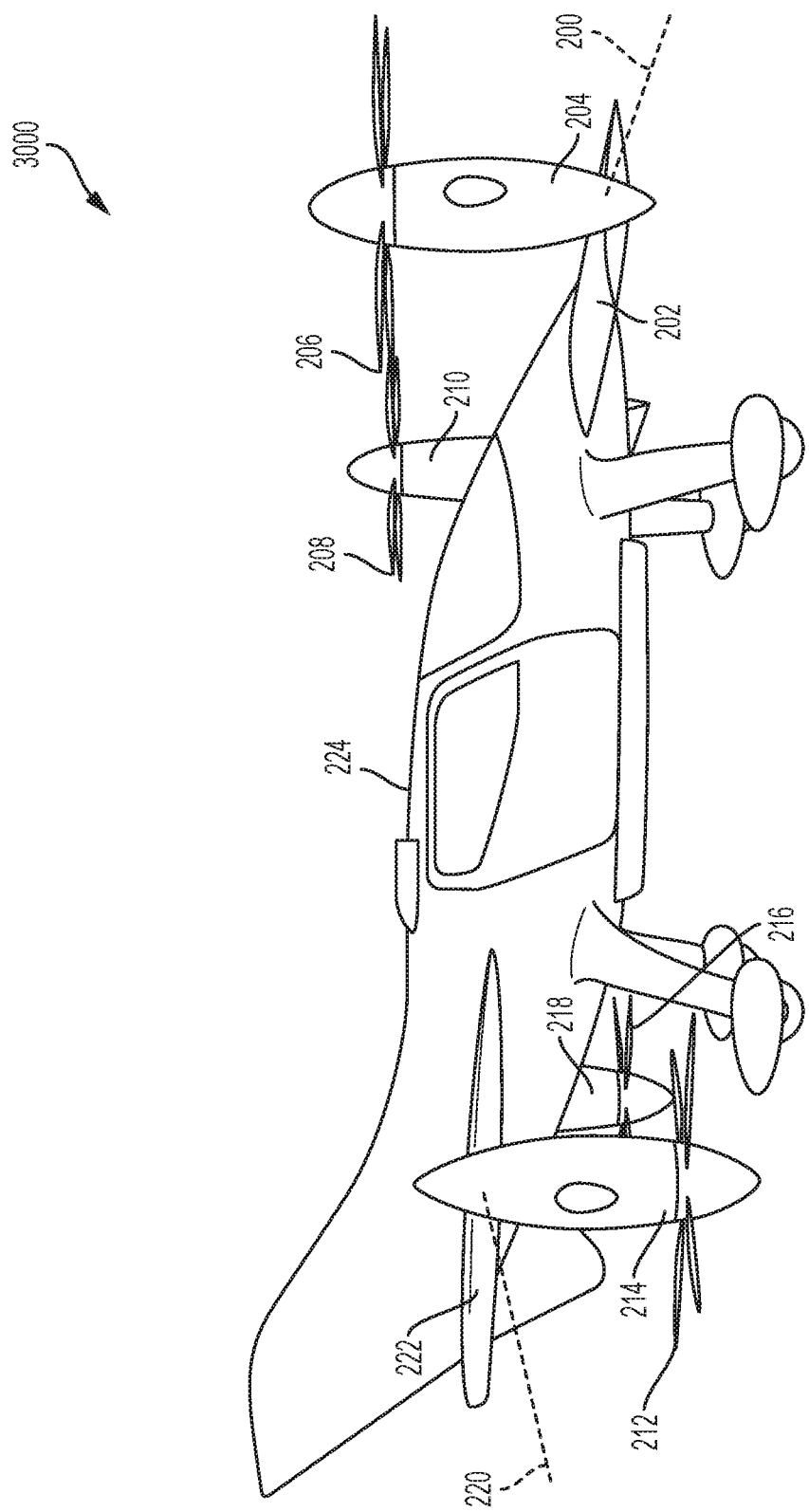
FIG. 4 is a partial isometric view of an aircraft with a single rotor attached to each side of a front and a rear wing in accordance with an illustrative embodiment.

FIG. 4 illustrates a vertical takeoff and landing aircraft 3000 with a front wing 202 that is attached in a fixed position to a fuselage 224 and a rear wing 222 that is attached in a fixed position to the fuselage 224. A front right motor nacelle 204 is attached to the front wing 202 such that it may pivot around a front vectoring axis 200 when cyclic control is applied to a front right rotor 206 to exert torque on the front right motor nacelle 204. A front left motor nacelle 210 is attached to the front wing 202 such that it may pivot around the front vectoring axis 200 when cyclic control is applied to a front left rotor 208 to exert torque on the front left nacelle 210. A rear right motor nacelle 214 is attached to the rear wing 222 such that it may pivot around a rear vectoring axis 220 when cyclic control is applied to a rear right rotor 212 to exert torque on the rear right nacelle 214. A rear left motor nacelle 218 is attached to the rear wing 222 such that it may pivot around a rear vectoring axis 220 when cyclic control is applied to a rear left rotor 216 to exert torque on the rear left nacelle 218.

The aircraft control system for aircraft 3000 may independently adjust the thrust and torque provided by the right front rotor 206, the left front rotor 208, the right rear rotor 212, and the left rear rotor 216 to adjust the amount and direction of thrust for each rotor. The aircraft control system for aircraft 3000 may also control the relative thrust and torque between each of the rotors to control the attitude of aircraft 3000.

Figure 5:
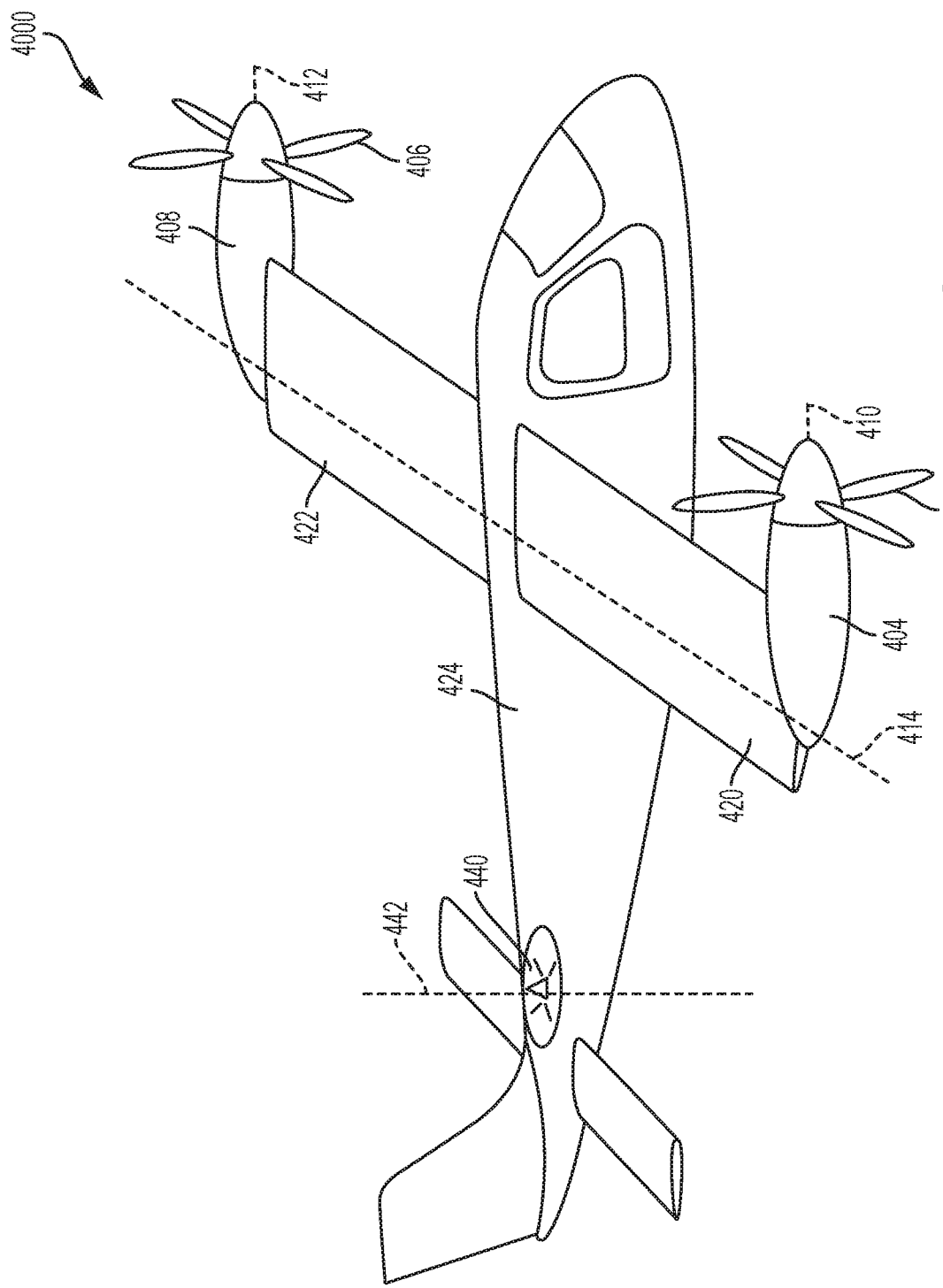
FIG. 5 is an isometric view of an aircraft with a single rotor attached to each end of a single pivoting wing capable of rotating with respect to the fuselage in accordance with an illustrative embodiment.

FIG. 5 illustrates a vertical takeoff and landing aircraft 4000 with a fuselage 424, a right wing 420, and a left wing 422. A right rotor 402 is attached to a right nacelle 404 to deliver thrust along a right thrust axis 410, and the right nacelle 404 is attached to the right wing 420. The right wing 420 may pivot with respect to the fuselage 424 around a wing pivot axis 414. A left rotor 406 is attached to a left nacelle 408 to deliver thrust along a left thrust axis 412, and the left nacelle 408 is attached to the left wing 422. The left wing 422 may pivot with respect to the fuselage 424 around the wing pivot axis 414. An auxiliary thrust system 440 is configured to deliver thrust along an auxiliary thrust axis 442.

The aircraft control system for the aircraft 4000 may independently control the thrust and torque delivered by the right rotor 402 and the left rotor 406 to adjust the relative thrust and relative angles of the right wing 420, the left wing 422, and the fuselage 424. The auxiliary thrust system 440 is configured to provide torque around the center of gravity of the aircraft 4000 to cause the aircraft control system to balance the torque applied to the fuselage 424 from the lift from the right wing 420, the lift provided by the left wing 422, the thrust and torque provided by the right rotor 402, and the thrust and torque provided by the left rotor 406, such that the attitude of the aircraft 4000 and the attitude of the fuselage 424 may be controlled.

Figure 6:
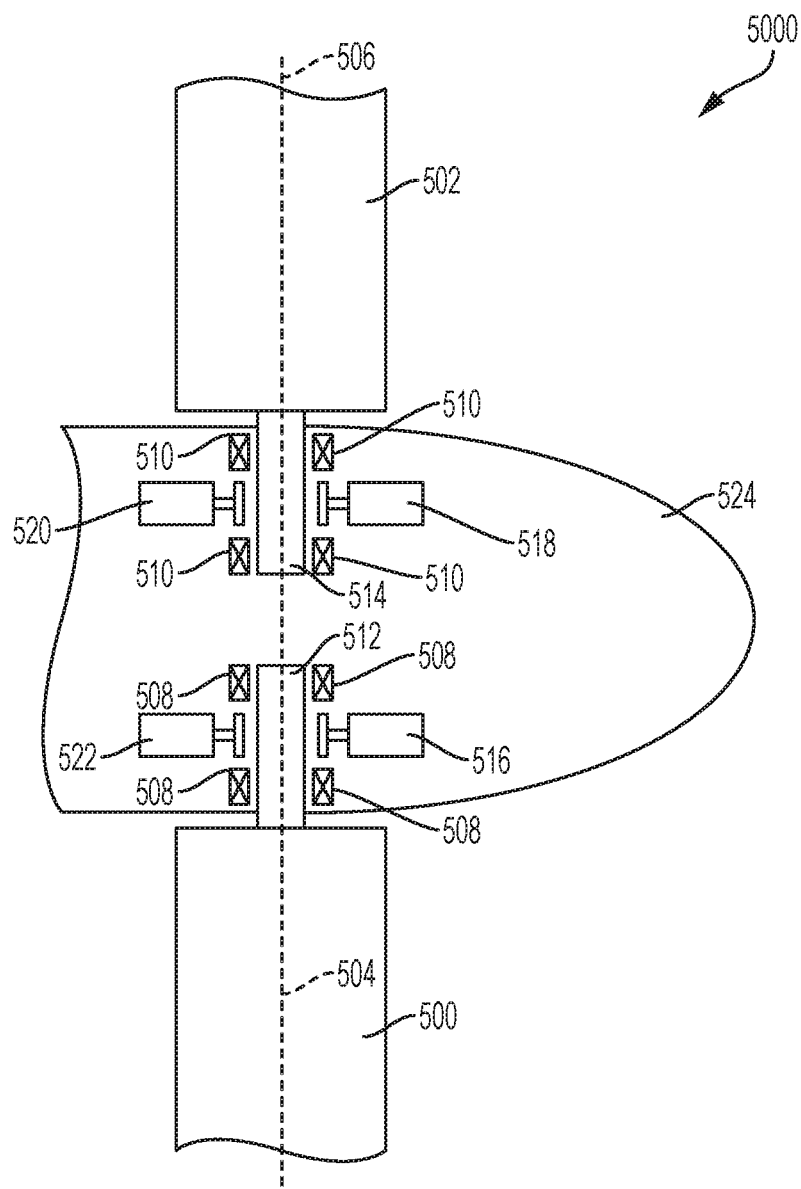
FIG. 6 is an isometric view showing an aircraft with a rotating wing spar on a front wing with a brake mechanism, a clockwise ratchet mechanism, and a counterclockwise ratchet mechanism in accordance with an illustrative embodiment.

FIG. 6 illustrates a wing tilt mechanism 5000 for a vertical takeoff and landing aircraft. A right wing 500 is attached rigidly to a right wing spar 512 such that it may rotate with respect to a fuselage 524 around a right wing pivot axis 504. A left wing 502 is attached rigidly to a left wing spar 514 such that it may rotate with respect to the fuselage 524 around a left wing pivot axis 506. Right bearings 508 are configured so that the right wing spar 512 may pivot with respect to the fuselage 524, and left bearings 510 are configured so that left wing spar 514 may pivot with respect to the fuselage 524. A right brake assembly 516 may provide resistance to the rotation of right wing 500 with respect to fuselage 524, and left brake assembly 518 may provide resistance to the rotation of the left wing 502 with respect to the fuselage 524. A right ratchet mechanism 522 may selectively provide resistance to rotation in one direction, and free rotation in the opposite direction, with respect to the fuselage 524. A left ratchet mechanism 520 may selectively provide resistance to rotation in one direction, and free rotation in the opposite direction, with respect to the fuselage 524.

The aircraft control system may selectively use the right brake assembly 516 and the left brake assembly 518 to fix the positions of the right wing 500 and the left wing 502 with respect to the fuselage 524, and may also permit them to rotate. The aircraft control system may also selectively use the right ratchet mechanism 522 and the left ratchet mechanism 520 to selectively control either the right wing 500 or the left wing 502 to rotate in one direction but not the opposite direction.

Figure 7:
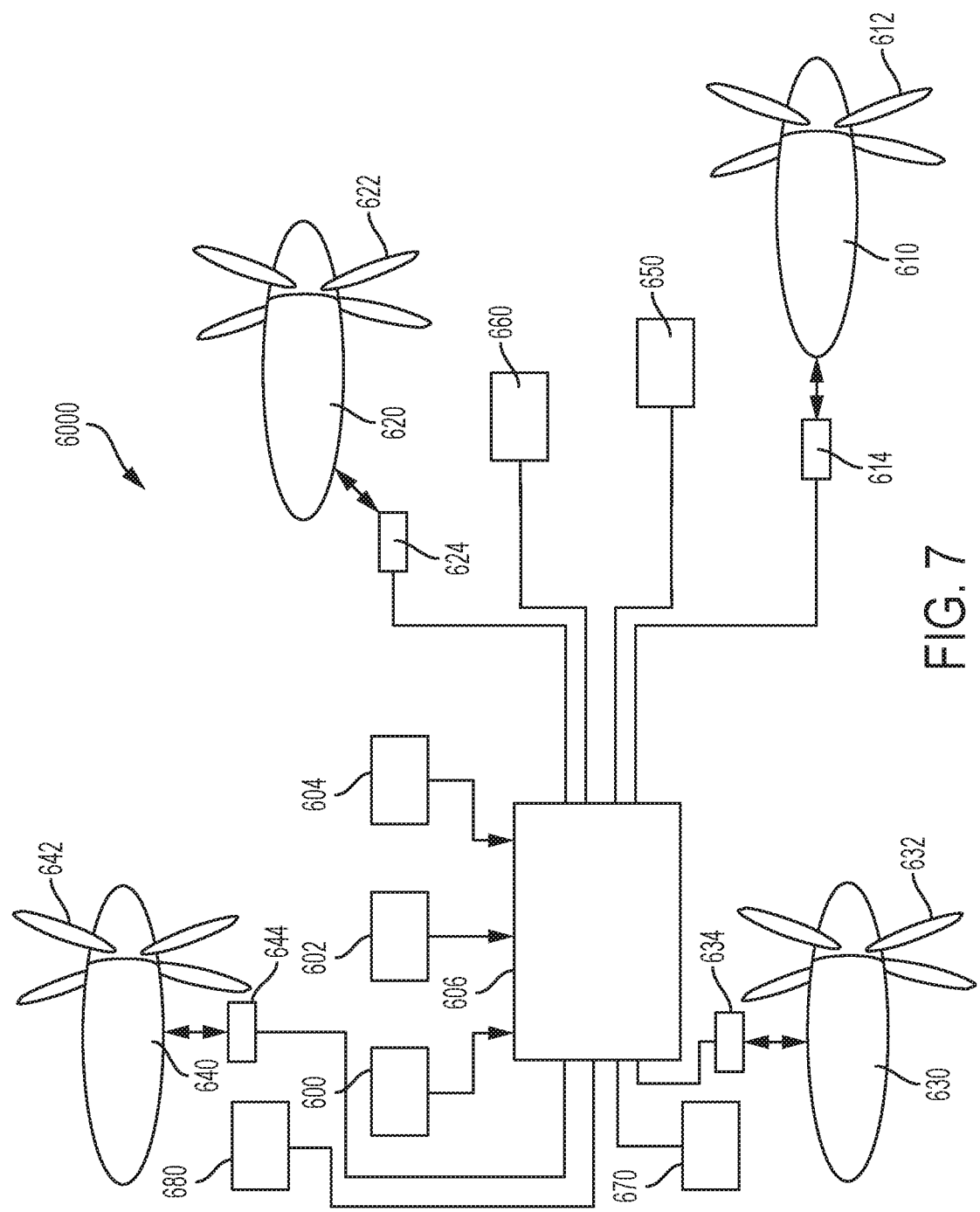
FIG. 7 illustrates a representation of an aircraft control system including a master control unit, an accelerometer and gyro sensor system, an air data system, and a position and torque sensor system in accordance with an illustrative embodiment.

FIG. 7 illustrates a representation of an aircraft control system 6000 including a master control unit 606, an accelerometer and gyro sensor system 600, an air data system 602, and a position and torque sensor system 604. The master control unit 606 receives data from the accelerometer and gyro sensor system 600, the air data system 602, and the position and torque sensor system 604, and processes the data with control algorithms to provide control sitmals to a right front rotor controller 614, a left front rotor controller 624, a right rear rotor controller 634, a left rear rotor controller 644, a right front wing brake and ratchet mechanism 650, a left front wing brake and ratchet mechanism 660, a right rear wing brake and ratchet mechanism 670, and a left rear wing brake and ratchet mechanism 680. The aircraft control system 6000 is configured to control pitch, yaw, and roll through individual application or combined application of thrust and torque from the right front rotor 612, the left front rotor 622, the right rear rotor 632, the left rear rotor 642, or any combination thereof. For example, as the aircraft transitions from a vertical flight configuration, as seen in FIG. 2, to a horizontal flight configuration, as seen in FIG. 1, the torque and thrust applied to the aircraft by the right front rotor 612 and the left front rotor 622 may be controlled along with the torque and thrust applied to the aircraft by the right rear rotor 632 and the left rear rotor 642 such that the master control unit 606 may use the aircraft attitude data from the accelerometer and gyro sensor system 600 to control the relative thrust and torque of each rotor on the aircraft to maintain the desired aircraft attitude while the wings and nacelles 610, 620, 630, 640 pivot from the vertical flight configuration to the horizontal flight configuration.

The aircraft control system 6000 may include memory with computer readable media stored thereon. Such computer readable media may be computer executable code that is executed by the master control unit 606 to implement the various methods and systems described herein. The master control unit 606 may be, for example, a computer processor. The instructions stored in a memory and executable by a processor may be implemented to perform methods such as a method 900 described below.

Figure 8:
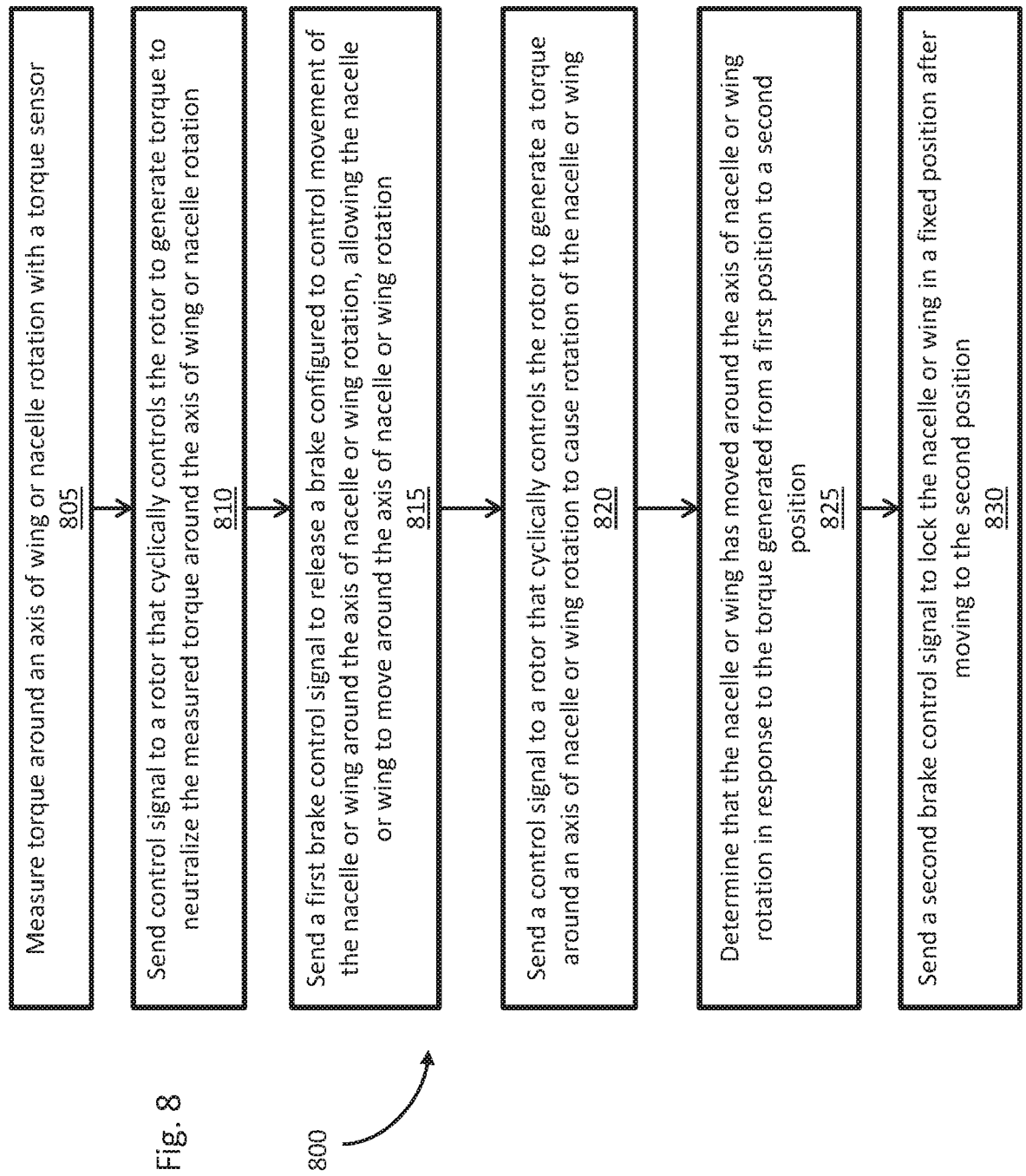
FIG. 8 is a flow diagram illustrating a method for controlling rotation of a nacelle or wing through cyclic control of a rotor in accordance with an illustrative embodiment.

FIG. 8 is a flow diagram illustrating the method 800 for controlling rotation of a nacelle or wing through cyclic control of a rotor in accordance with an illustrative embodiment. In alternative embodiments, fewer, additional, and/or different operations may be performed. Also, the use of a flow diagram is not meant to be limiting with respect to the order of operations performed. As discussed below, the methods 800 and 900 may be used to rotate a nacelle or wing. When the phrase "nacelle or wing" is used, it should be understood that the torque generated from a rotor may cause the rotation of a nacelle only, or both a nacelle and a wing to which the nacelle is attached as described herein.

At block 805, the system measures the torque around an axis of wing or nacelle rotation with a torque sensor. In other words, the existing torque being exerted on a wing or nacelle is measured. That torque may be as a result of any aerodynamic or other forces on the wing or nacelle. The torque on the nacelle or wing is measured so that it can be counteracted/neutralized (see block 810) before releasing the brake (815). Without counteracting/neutralizing the existing torque before releasing the brake, releasing the brake may result in a sudden, immediate rotation of the wing or nacelle that may not be smooth or desirable.

At block 810, the system sends a control signal to a rotor that cyclically controls the rotor to generate torque to neutralize or substantially neutralize the measured torque around the axis of wing or nacelle rotation. The rotor may be a rotor affixed to the wing as described herein, or may be the rotor associated with the nacelle. In various embodiments, rather than completely or substantially neutralize the torque, the control signal may cause the cyclical control of the rotor to generate torque such that only a small amount of the measured torque remains. This may be particularly useful where, for example, the measured torque is already in the direction in which the system wants the wing or nacelle to rotate. By leaving a small amount of the torque, the wing or nacelle may start to move slowly and/or smoothly once the brake is released (see block 815).

At block 815, the system sends a first brake control signal to release a brake configured to control movement of the nacelle or wing around the axis of nacelle or wing rotation, such that the nacelle or wing may move around the axis of nacelle or wing rotation. In various embodiments where the control signal and cyclic control of a rotor does not completely neutralize the measured torque on the wing or nacelle, the wing or nacelle may actually start to move in response to that torque that has not been neutralized. This may be done before, after, or at the same time as any of the signals to generate torque using cyclic control is sent (e.g., the control signal of block 810, the control signal of block 820). In other words, by releasing the brake, the nacelle or wing is able to rotate around its axis. In one embodiment, the brake is not released (block 815) until after the control signal of block 810 is sent, but is released before the control signal of block 820 is sent. In another embodiment, the brake is released (block 815) after the control signal of block 810 is sent, but is released generally simultaneously with the control signal of block 820 being sent. In various embodiments, the brake may be released to different degrees, and may be released to different degrees at different times. For example, a brake may initially be fully released such that the nacelle or wing starts moving, and may be engaged or partially locked as the nacelle or wing moves in order to slow down the nacelle or wing before it is completely locked into position by the brake. Sensors may be used to monitor the position of the nacelle or wing or the speed at which it is moving in order to properly manage the brake, speed of the nacelle or wing, and/or the position of the nacelle or wing.

At block 820, the system sends a second control signal to a rotor that cyclically controls the rotor to generate a torque around an axis of nacelle or wing rotation to cause rotation of the nacelle or wing. The rotor may be the same rotor to which the control signal of block 810 was sent, or may be a different rotor on the same wing as the rotor to which the control signal of block 810 was sent. In this way, torque can be generated to move the nacelle or wing to a desired angular position.

At block 825, the system determines that the nacelle or wing has moved around the axis of nacelle or wing rotation, in response to the torque generated, from a first position to a second position. The second position may be the desired position of the wing or nacelle, or may be a position at which the system recognizes the brake should be applied to slow the rotation down so that the wing or nacelle can be stopped by the time it reaches the desired position. This may be done by proximity sensors installed on the fuselage, pressure sensors that indicate the nacelle or wing has reached the second position, or any other sensing system to locate or track the movement of the nacelle or wing. After the nacelle or wing has moved to the desired position, the system sends a second brake control signal to lock the nacelle or wing in a fixed position after moving to the second position at block 830. This method 800 may be used to move the nacelle or wing in either direction. That is, after the method 800 is used to move a nacelle or wing from a first position to a second position, the method 800 may be repeated to move the nacelle or wing back to the first position. The only difference may be that the control signal causes the rotor to generate a torque in the opposite direction around the axis of rotation of the nacelle or wing, causing the nacelle or wing to move in the opposite direction back to the first position. In another embodiment, the nacelle or wing may move in the same direction to return to the first position by rotating all the way around its axis of rotation. Thus, the control signal may cause the rotor to generate torque in the same direction.

Figure 9:
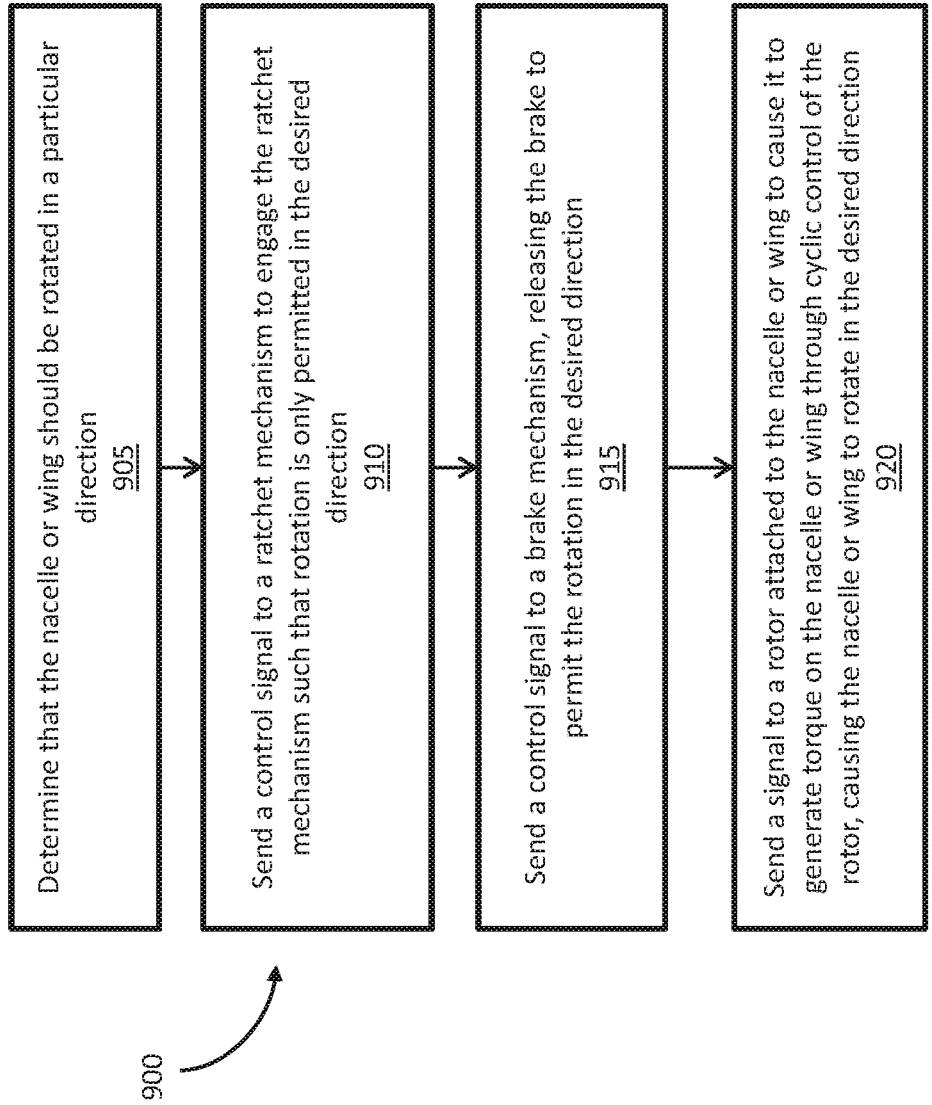
FIG. 9 is a flow diagram illustrating a method for controlling rotation of a wing using cyclic control of a rotor and a ratchet mechanism in accordance with an illustrative embodiment.

FIG. 9 is a flow diagram illustrating a method 900 for controlling rotation of a wing using cyclic control of a rotor and a ratchet mechanism in accordance with an illustrative embodiment. In alternative embodiments, fewer, additional, and/or different operations may be performed. Also, the use of a flow diagram is not meant to be limiting with respect to the order of operations performed. At block 905, the system determines that the nacelle or wing should be rotated in a particular direction. This determination may be made from a control signal and/or sensor data, including based on data from sensors indicating that aerodynamic loads on the nacelle or wing are creating torque that would rotate the nacelle or wing in the opposite direction. At block 910, the system sends a control signal to a ratchet mechanism to engage the ratchet mechanism such that rotation is only permitted in the desired direction. At block 915, the system sends a control signal to a brake mechanism, releasing the brake and permitting rotation. The nacelle or wing is now free to rotate in the desired direction, but is prevented by the ratchet mechanism from rotating in the opposite direction due to the aerodynamic loads from airflow on the nacelle or wing. At block 920, the system sends a signal to a rotor attached to the nacelle or wing to cause it to generate torque on the nacelle or wing through cyclic control of the rotor, wherein the torque causes the nacelle or wing to rotate in the desired direction.

In an illustrative embodiment, any of the operations described herein may be implemented at least in part as computer-readable instructions stored on a computer-readable medium or memory. Upon execution of the computer-readable instructions by a processor, the computer-readable instructions may cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or from practice of the disclosed embodiments. It is intended that the scope of the invention be defined by the claims appended hereto and their equivalents.

What is claimed is:

1. An aircraft comprising:
a fuselage;
a wing;
a propulsion system attached to the wing, the propulsion system comprising a rotor having both collective and cyclic control;
an axis of wing rotation substantially aligned with a spanwise direction of the wing wherein the wing is rotatable around the axis of wing rotation with respect to the fuselage; and
a control system utilizing torque generated through cyclic control of the rotor to rotate the wing and the propulsion system around the axis of wing rotation; and
a ratchet mechanism configured to selectively:
prevent rotation of the wing around the axis of wing rotation in a first direction while permitting rotation in a second direction, or
prevent rotation of the wing around the axis of wing rotation in the second direction while permitting rotation in the first direction.

2. The aircraft of claim 1, wherein the aircraft includes a plurality of wings, with a propulsion system attached to each wing.

3. The aircraft of claim 1, further comprising a brake mechanism configured to selectively prevent or permit rotation of the wing around the axis of wing rotation.

4. The aircraft of claim 1, wherein the control system is further configured to selectively control whether the ratchet mechanism permits rotation of the wing in the first direction or the second direction.

5. An aircraft comprising:
a fuselage;
a first wing;
a second wing;
a first propulsion system attached to the first wing, the first propulsion system comprising a first rotor having both collective and cyclic control;
a second propulsion system attached to the second wing, the second propulsion system comprising a second rotor having both collective and cyclic control;
a first axis of wing rotation substantially aligned with a first spanwise direction of the first wing whereby the first wing is rotatable around the first axis of wing rotation with respect to the fuselage;
a second axis of wing rotation substantially aligned with a second spanwise direction of the second wing whereby the second wing is rotatable around the second axis of wing rotation with respect to the fuselage;
a control system utilizing torque generated through cyclic control of the first rotor and the second rotor to independently rotate the first wing and the second wing about their respective axes of rotation; and
a ratchet mechanism configured to selectively:
prevent rotation of the first wing around the first axis of wing rotation in a first direction while permitting rotation in a second direction, or
prevent rotation of the first wing around the first axis of wing rotation in the second direction while permitting rotation in the first direction.

6. The aircraft of claim 5, wherein a first center of lift of the first wing and a second center of lift of the second wing are on opposite sides of an axis passing through the aircraft's center of gravity, and wherein the control system utilizes the torque of the first rotor and the torque of the second rotor to position the first wing and the second wing to exert a torque on the aircraft around the axis passing through the aircraft's center of gravity.

7. The aircraft of claim 5, further comprising a first brake mechanism configured to selectively prevent or permit rotation of the first wing around the first axis of wing rotation and a second brake mechanism configured to prevent or permit rotation of the second wing around the second axis of wing rotation.

8. The aircraft of claim 5, wherein the ratchet mechanism is a first ratchet mechanism, and the aircraft further comprises a second direction, and a second ratchet mechanism configured to selectively:

prevent rotation of the second wing around the second axis of wing rotation in a third direction while permitting rotation in a fourth direction, or prevent rotation of the second wing around the second axis of wing rotation in the fourth direction while permitting rotation in the third direction.

9. An aircraft comprising:
a fuselage;
a wing;
a propulsion system with a rotor having both collective and cyclic control;
an axis of thrust rotation substantially aligned with a spanwise direction of the wing whereby the propulsion system is rotatable around the axis of thrust rotation with respect to the fuselage; and
a control system utilizing torque generated through cyclic control of the rotor to rotate the propulsion system around the axis of thrust rotation; and
a ratchet mechanism configured to selectively:
prevent rotation of the propulsion system around the axis of thrust rotation in a first direction while permitting the rotation in a second direction, or
prevent rotation of the propulsion system around the axis of thrust rotation in the second direction while permitting the rotation in the first direction.

10. The aircraft of claim 9, wherein the aircraft includes a plurality of propulsion systems each having an axis of thrust rotation with respect to the fuselage.

11. The aircraft of claim 9, further comprising a brake mechanism configured to selectively prevent or permit rotation of the propulsion system around the axis of thrust rotation.

12. The aircraft of claim 9, wherein the control system is further configured to selectively control whether the ratchet mechanism permits rotation of the propulsion system in the first direction or the second direction.

13. A method comprising:
sending, by at least one processor of a computing device, a first control signal to a rotor, wherein:
the rotor is configured to be cyclically controlled,
the rotor is attached to a nacelle of an aircraft,
the nacelle of the aircraft is configured to rotate around an axis of nacelle rotation whereby the nacelle is rotatable around the axis of nacelle rotation with respect to the fuselage, and
the first control signal cyclically controls the rotor to generate a torque around the axis of nacelle rotation; and
sending, by the at least one processor, a second control signal to a ratchet mechanism, wherein:
the ratchet mechanism is configured to selectively:
prevent rotation of the nacelle around the axis of nacelle rotation in a first direction while permitting the rotation in a second direction, or
prevent rotation of the nacelle around the axis of nacelle rotation in the second direction while permitting the rotation in the first direction; and
the second control signal controls whether the ratchet mechanism permits rotation of the nacelle in the first direction or the second direction.

14. The method of claim 13, further comprising sending, by the at least one processor, a first brake control signal to release a brake configured to control movement of the nacelle around the axis of nacelle rotation such that the nacelle moves in response to the torque generated.

15. The method of claim 14, further comprising:
determining, by the at least one processor, that the nacelle has moved around the axis of nacelle rotation in response to the torque generated from a first position to a second position; and
sending, by the at least one processor, a second brake control signal to lock the nacelle in a fixed position after moving to the second position.

16. The method of claim 13, wherein the nacelle is attached rigidly to a wing, and wherein both the wing and the nacelle are configured rotate around the same axis of nacelle rotation with respect to the fuselage.

17. The method of claim 16, wherein the axis of nacelle rotation is substantially parallel with a spanwise direction of the wing.

18. A non-transitory computer readable medium having instructions stored thereon that, upon execution by a computing device, cause the computing device to perform operations, wherein the instructions comprise:
instructions to send a first control signal to a rotor, wherein:
the rotor is configured to be cyclically controlled,
the rotor is attached to a nacelle of an aircraft,
the nacelle of the aircraft is configured to rotate around an axis of nacelle rotation whereby the nacelle is rotatable around the axis of nacelle rotation with respect to the fuselage, and
the first control signal cyclically controls the rotor to generate a torque around the axis of nacelle rotation; and
instructions to send a second control signal to a ratchet mechanism, wherein:
the ratchet mechanism is configured to selectively:
prevent rotation of the nacelle around the axis of nacelle rotation in a first direction while permitting the rotation in a second direction, or
prevent rotation of the nacelle around the axis of nacelle rotation in the second direction while permitting the rotation in the first direction; and
the second control signal controls whether the ratchet mechanism permits rotation of the nacelle in the first direction or the second direction.

19. The non-transitory computer readable medium of claim 18, further comprising instructions to send a first brake control signal to release a brake configured to control movement of the nacelle around the axis of nacelle rotation such that the nacelle moves in response to the torque generated.

20. The non-transitory computer readable medium of claim 19, further comprising:
instructions to determine that the nacelle has moved around the axis of nacelle rotation in response to the torque generated from a first position to a second position; and
instructions to send a second brake control signal to lock the nacelle in a fixed position after moving to the second position.

21. The non-transitory computer readable medium of claim 18, wherein the nacelle is attached rigidly to a wing, and wherein both the wing and the nacelle are configured rotate around the same axis of nacelle rotation with respect to the fuselage.

22. The non-transitory computer readable medium of claim 21, wherein the axis of nacelle rotation is substantially parallel with a spanwise direction of the wing.

* * * * *